United States Patent
Tseng

(10) Patent No.: US 7,400,068 B2
(45) Date of Patent: Jul. 15, 2008

(54) VOICE COIL MOTOR APPARATUS

(75) Inventor: Yu-Kuang Tseng, Hsinchu (TW)

(73) Assignee: Vasstek International Corp., Hsinchu (TW)

( * ) Notice: Subject to any disclaimer, the term of this patent is extended or adjusted under 35 U.S.C. 154(b) by 418 days.

(21) Appl. No.: 11/117,535

(22) Filed: Apr. 29, 2005

(65) Prior Publication Data
US 2006/0214520 A1    Sep. 28, 2006

(30) Foreign Application Priority Data
Mar. 24, 2005    (TW) .............................. 94109129 A

(51) Int. Cl.
*H02K 41/00* (2006.01)

(52) U.S. Cl. ........................ 310/12; 359/824

(58) Field of Classification Search ............. 310/12–39; 369/147; 348/E5.028; 359/814–825, 694
See application file for complete search history.

(56) References Cited
U.S. PATENT DOCUMENTS

| | | | | |
|---|---|---|---|---|
| 3,157,048 A | * | 11/1964 | Williams | .................. 73/304 R |
| 5,220,461 A | * | 6/1993 | Inoue et al. | .................. 359/824 |
| 6,134,058 A | * | 10/2000 | Mohri et al. | ................. 359/824 |
| 6,532,118 B2 | * | 3/2003 | Ohno | .......................... 359/824 |

* cited by examiner

*Primary Examiner*—Dang D Le
(74) *Attorney, Agent, or Firm*—Rosenberg, Klein & Lee

(57) ABSTRACT

A voice coil motor apparatus applied to an auto-focus or variable-focus lens module of a miniaturized camera includes: a voice coil motor, a plurality of steel guidance shafts, a lens holder, and a base. The voice coil motor also includes a magnetic part including magnets and yokes, and an electrical part including a coil winding. The magnetic part is rigidly coupled to the lens holder to form the moving member. The electrical part and the steel guidance shafts are fixed on the base to form the non-moving member. The pre-loaded force due to the interaction between the leakage flux of the magnetic part and the steel guidance shafts eliminates the free-play resulting from the tolerance gap between the moving and the non-moving members, and that the magnets and the yokes form a non-circular magnetic structure having a rectangular contour in order to minimize the overall dimension.

3 Claims, 3 Drawing Sheets

A-A

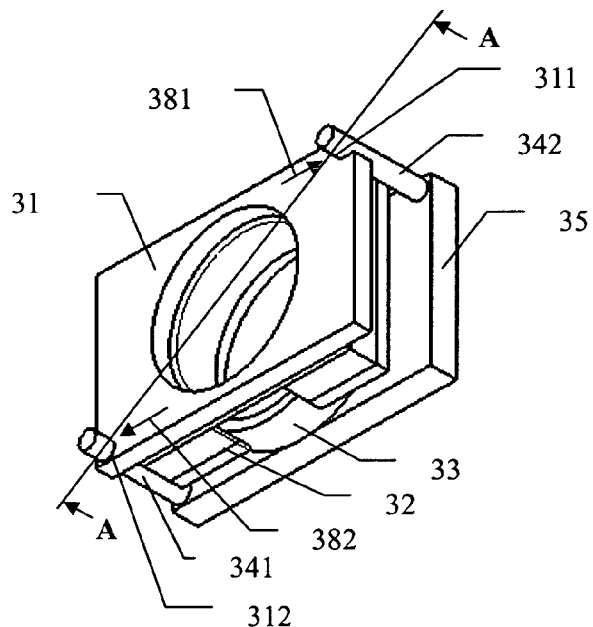 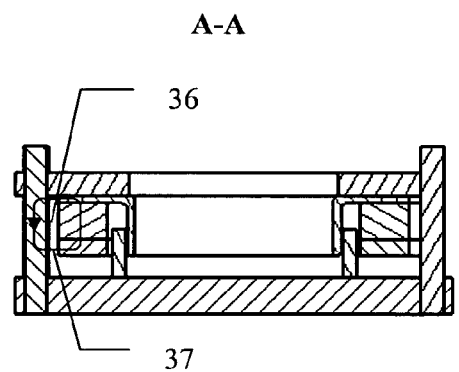
Fig. 3a  Fig. 3b
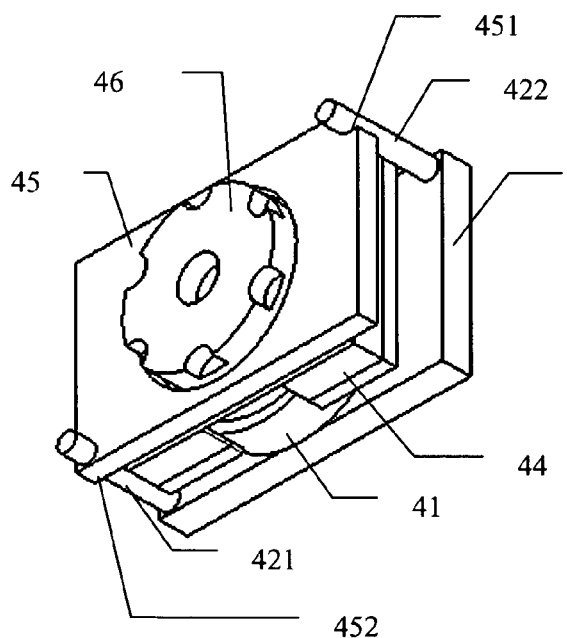 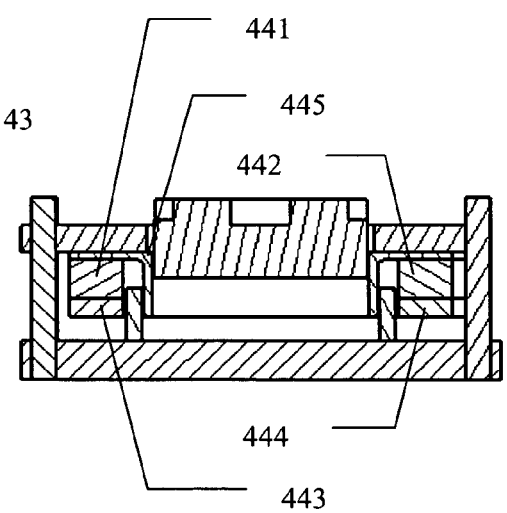
Fig. 4a  Fig. 4b

VOICE COIL MOTOR APPARATUS

BACKGROUND OF THE INVENTION

1. Field of the Invention

The present invention relates to a miniaturized voice coil motor apparatus with a magnetically pre-loaded precision guidance, particularly to a voice coil motor apparatus, which drives the lens module of miniaturized camera.

2. Description of the Related Art

As shown in FIG. 5, the conventional cylindrical voice coil motor comprises: a concentric yoke 51 having a U-shape section; multiple segments of arc-type magnets 52, which is attached to the inner face of the U-shape sectional concentric yoke 51 to form a closed magnetic field; and a coil 53, disposed inside the gap 54 between the magnet 52 and the yoke 51; wherein a current flowing through the coil 53 will interact with the magnetic field inside the gap 54, which will generate a thrust. In order to maintain the uniformity of the spacing between the coil 53 and the magnet 52 and the spacing between the coil 53 and the yoke 51, several methods can be used to support and guide the coil 53 inside the cylindrical voice coil motor: firstly, a precision cylindrical linear bearing is adopted, wherein the cylinder bushing portion is rigidly coupled to the yoke 51, and the coil 53 is rigidly coupled to the spool portion, and then a non-contact precision and parallel sliding motion between the coil 53 and the yoke 51 can be maintained as the precision cylindrical linear bearing has rolling balls installed there between; secondly, when the coil 53 moves only a relatively short distance, two pieces of elastic platelets are rigidly coupled to the coil 53, which can also achieve the non-contact precision and parallel sliding motion between the coil 53 and the yoke 51 theoretically if both elastic platelets have an exactly identical elastic modulus; thirdly, in the non-precision application, the coil 53 is coupled to a sliding cylinder, wherein the inner rim of the cylinder slidably contacts the outer rim of the yoke 51 in order to achieve a non-contact sliding motion between the coil 53 and the yoke 51, and wherein the friction and parallelism of motion depends on the gap resulting from the tolerances of the inner and the outer rims.

However, the application of the conventional voice coil motor to drive the lens module of the miniaturized camera has the following bottlenecks:

(a) The lens is a movable piece and driven by the voice coil motor to move back and forth to achieve the objective of auto-focus or variable-focus, which, in addition to a high repeatability of positioning, also demands a high standard about the runout between the motion axis and the optical axis. If the first method mentioned above is adopted, the accomplishments in the motion repeatability and the friction are superior, but the precision linear bearing is expensive and has a bottleneck in miniaturization. In the antecedent of mass-producing the miniaturized camera, it is not practical. If the second method mentioned above is adopted, the image quality of the miniaturized camera will be influenced owing to the runout resulting from the difference in the elastic moduli of the elastic platelets or the difference in the magnetizations of multiple segments of arc type magnets; further, in its application to the portable miniaturized camera, the gravity of lens will also results in motion runout; therefore, adopting the second method will incur a lower yield in mass-production; moreover, the gravity-induced runout will obviously worsen the image quality in the future high-pixel miniaturized camera. If the third method mentioned above is adopted, the runout of the motion axis is controlled via the confinement of the strict assemblage tolerance between the moving and the non-moving members; however, the precision of the component injection molds are not so uniform and hard to control, which will result in unstable quality in mass-production, wherein the components are assembled randomly and the friction between the moving and non-moving members and the angle of motion runout are variable; too tight tolerance induces too high friction, which further induces the voice coil motor to be hard to drive as the force output by the voice coil motor is so limitary; too loose tolerance induces too large free-play angle, which further induces the image quality to be lowered down. Therefore, it is desired to invent a low-cost guiding mechanism, wherein the friction and the runout angle are irrespective of the assemblage tolerance between the moving and non-moving members and the gravity of the lens module, to enable the mass-production of voice coil motor, which is applied to the lens module of the miniaturized camera, to be realized.

(b) In order to satisfy the demand for the portable miniaturized camera, miniaturizing the modules' size to meet the dimensional limitation in the portable device is the current tendency in the market; however, the dimensional miniaturization is limited by the fabrication capability of the thin magnet owing to the symmetric structure of the conventional voice coil motor; therefore, how to break through the above problems from the view of magnetic structure design to achieve the objective of size miniaturization is an important subject.

SUMMARY OF THE PRESENT INVENTION

The primary objective of the present invention is to proposes a low-cost miniaturized voice coil motor apparatus having a guidance mechanism with a magnetic pre-load and without any free-play in order to overcome the drawbacks and bottlenecks appearing in the application of the conventional voice coil motor to the driving of lens module of the miniaturized camera.

The voice coil motor apparatus of the present invention is characterized in that the magnetic flux leakage from the voice coil motor itself generates a pre-load on the guidance steel shaft, which enables the friction to be constant and the gap between the contact faces of the moving and non-moving members to be eliminated so that the lens module can has a motion with low friction and high repeatability and without any free-play. The voice coil motor apparatus of the present invention is also characterized in that the voice coil motor has a non-circular but rectangular magnetic structure, which can concentrate the magnetic flux to output maximum force under a given length and width thereof.

The voice coil motor apparatus of the present invention comprises: a magnetic part, an electrical part, a plurality of guidance steel shafts, a lens holder, and a base, wherein the magnetic part has a plurality of non-annular magnets and a plurality of non-annular surface yokes, which are stacked along the moving axis of the voice coil motor and around the outer rim of the central annular wall of the bottom yoke to form an inner annular gap between the non-annular surface yokes and the central annular wall, and the magnetic part is characterized in that it has a non-circular but rectangular magnetic structure, and that the inner annular gap has a primary excitation magnetic field, which will generate the pushing force, and the exterior of the magnetic structure has a leakage magnetic field, which will generate a pre-load; and wherein the electrical part comprises at least one coil and is disposed inside the inner annular gap, and when a current flows through the coil, it will interact with the primary excitation magnetic field to generate a thrust; and wherein the lens holder is rigidly coupled to the magnetic part to form the moving member of the apparatus, and the lens holder has an threaded hole to fix the lens and a plurality of round holes or open arc faces near the perimeter to form a plurality of guiding faces in order to slidably contact the plurality of guidance steel shafts; and wherein the plurality of guidance steel shafts are made of a ferromagnetic material and disposed beside the inner rims of the round-hole or open-arc guiding faces and keep a spacing to the magnetic part, and the leakage magnetic flux will cross the spacing to magnetically interlink the guidance steel shafts to form closed magnetic loops and generate pre-loads, and the resultant moment of those pre-loads enables the round-hole or open-arc guiding faces to tightly and slidably contact the guidance steel shafts so that the sliding motion without free-play can be achieved; and wherein the electrical part and the plurality of guidance steel shafts are fixed on the base to form the non-moving member of the apparatus.

BRIEF DESCRIPTION OF THE DRAWINGS

FIG. 3a shows schematically a perspective diagram of the magnetically pre-loaded and non-free-play guiding mechanism according to yet another embodiment of the present invention.

FIG. 3b shows schematically a sectional diagram of the magnetically pre-loaded and non-free-play guiding mechanism according to yet another embodiment of the present invention.

FIG. 4a shows schematically a perspective structure diagram according to one preferred embodiment of the present invention.

FIG. 4b shows schematically a sectional structure diagram according to one preferred embodiment of the present invention.

DETAILED DESCRIPTION OF THE INVENTION

To enable the technical contents of the present invention to be more easily understood, the detailed description of the present invention is to be stated below in cooperation with the attached drawings.

Figures 1A, 1B:
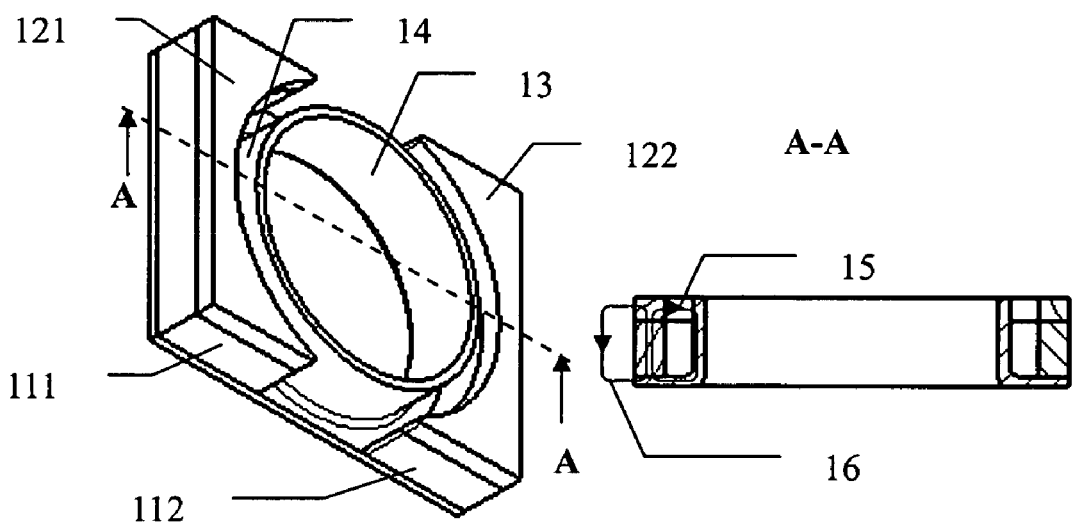
FIG. 1a shows schematically a perspective diagram of the non-circular but rectangular magnetic structure adopting two magnets according to one embodiment of the present invention.
FIG. 1b shows schematically a sectional diagram of the non-circular but rectangular magnetic structure adopting two magnets according to one embodiment of the present invention.
Figure 2:
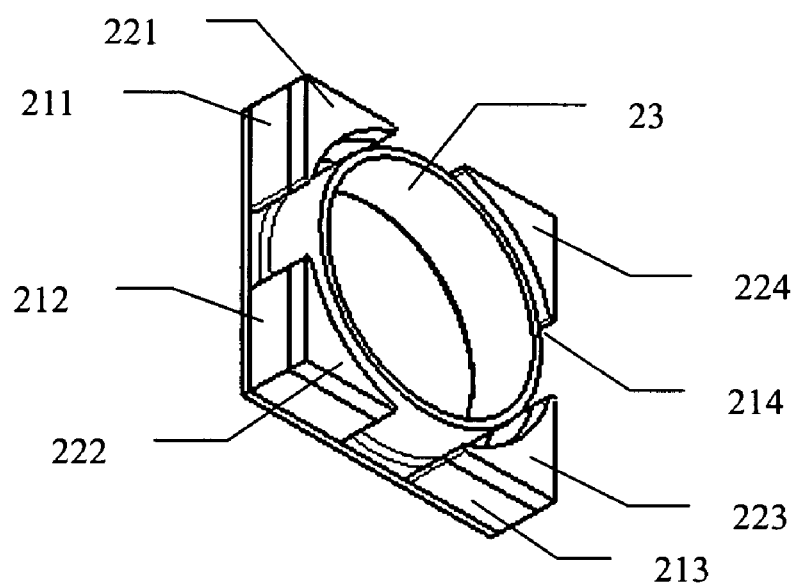
FIG. 2 shows schematically a perspective diagram of the non-circular but rectangular magnetic structure adopting four magnets according to another embodiment of the present invention.
Figure 5:
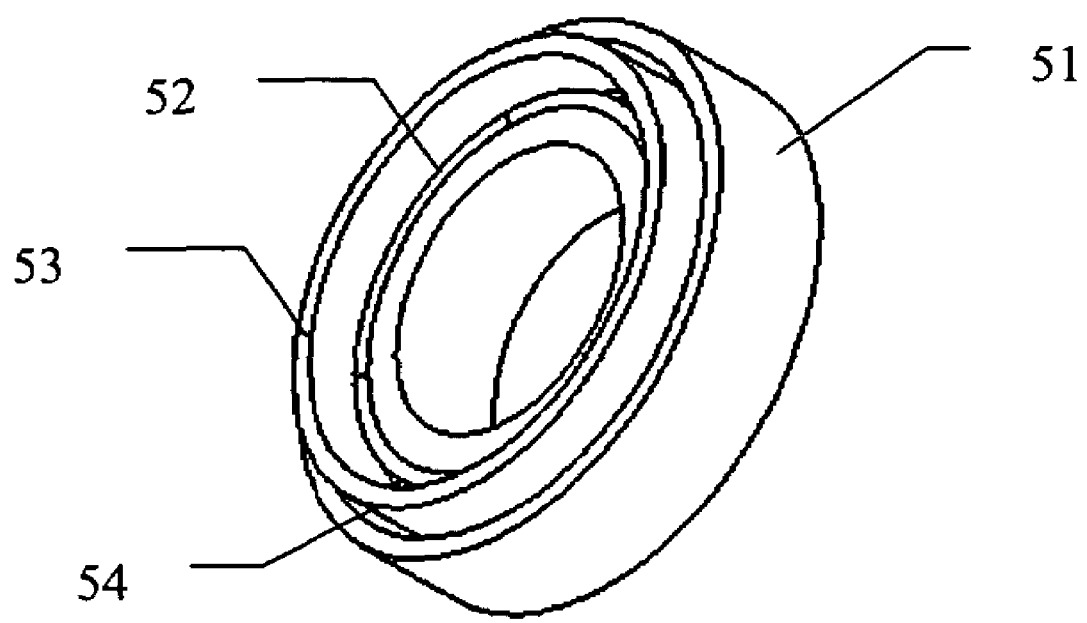
FIG. 5 shows schematically a perspective diagram of the magnetic structure of a conventional cylindrical voice coil motor.

Referring to FIG. 1a and FIG. 1b, the magnetic structure of the present invention comprises: two non-annular magnets 111 and 112, two non-annular surface yokes 121 and 122, and a bottom yoke 13 with a central annular wall, which are stacked along the moving axis of the voice coil motor. The non-circular magnetic structure has a rectangular contour and forms two closed magnetic loops. One of the closed magnetic loops is the primary magnetic line 15 that generates the thrust, and the primary magnetic line 15 proceeds from the upper surface of the non-annular magnets 111 or 112 and through the non-annular surface yoke 121 or 122 and cross an inner annular gap 14 to reach the central annular wall of the bottom yoke 13 and then is guided by the bottom yoke 13 back to the lower surface of the non-annular magnets 111 or 112. The other of the closed magnetic loops is the leakage magnetic line 16 that generates the pre-load, and the leakage magnetic line 16 proceeds from the upper surface of the non-annular magnets 111 or 112 and through the non-annular surface yoke 121 or 122 and through the external air between the bottom yoke 13 and the non-annular surface yoke 121 or 122 to reach the outer rim of the bottom yoke 13 and then is guided by the bottom yoke 13 back to the lower surface of the non-annular magnets 111 or 112. In contrast to the conventional circular-symmetry magnetic structure, the magnetic structure is characterized in that the area defined by the rectangle can be fully exploited to install the magnets under the space limitation of a specific diameter of the hollow circle and specific length and width of the whole structure, and two non-annular surface yokes 121, 122 can be utilized to concentrate magnetic flux. The magnetic structure of the present invention not only can achieve the smallest dimension for a given output force, but also can solve the bottleneck resulting from the fabrication problem of the thin magnet. Extending from the idea mentioned above, the magnetic part can also comprises: four non-annular magnets 211, 212, 213, and 214, four non-annular surface yokes 221, 222, 223, and 224, and a bottom yoke 23 with a central annular wall, as shown in FIG. 2.

The electrical part of the present invention comprising at least one coil is disposed inside the inner annular gap 14 and fixed on a base. When a current flows through the coil, it will interact with the primary magnetic line to generate a pushing force. In contrast to the conventional voice coil motor, the static-coil design of the voice coil motor of the present invention is free from moving the cable providing power for voice coil motor, and thus, the reliability of the apparatus service life can be promoted.

The voice coil motor apparatus of the present invention can achieve a guiding mechanism with a magnetic pre-load and without any free-play. Referring to FIG. 3a and FIG. 3b, the magnetic part 32 is rigidly coupled to a lens holder 31 to form the moving member of the voice coil motor apparatus. The coil 33 and two guidance steel shafts 341, 342 are respectively fixed to a base 35 to form the non-moving member of the voice coil motor apparatus. Those two guidance steel shafts 341, 342 are respectively disposed inside two open-arc guiding faces 311, 312 of the lens holder 31 and respectively keep a spacing 36 away from the outer rim of the magnetic part 32. The magnetic part 32 has a leakage magnetic line 37, which will proceed through those two guidance steel shafts 341 and 342 to form closed magnetic loops, and two magnetic pre-load 381 and 382 will appear on the moving member's faces confronting two guidance steel shafts 341, 342. The resultant moment of two magnetic pre-load 381 and 382 will induce the open-arc guiding faces 311, 312 of the lens holder 31 to be closely attached to the surfaces of two guidance steel shafts 341, 342. Even though there are gaps owing to tolerances between the diameters or centers of two guidance steel shafts 341, 342 and two open-arc guiding faces 311, 312, the moving member is apt to close to the open-arc guiding face having smaller gap because the smaller the gap, the larger the force, and thus, the other open-arc guiding face is only linearly contacted by the moving member. Such an inventive guiding mechanism design enables the relative motion between the moving and non-moving members to be a sliding motion without any free-play, which will promote the accuracy of the positioning repeatability of the voice coil motor. Further, such a guiding mechanism also reduces the parallelism requirement of those two guidance steel shafts 341, 342 and also enables the friction of the guiding mechanism to only relate to the magnetic pre-loads and to be irrespective of the assemblage tolerance, which will promote the yield of the mass production of the voice coil motor.

When the present invention is applied to drive the lens module of the miniaturized camera, the preferred embodiment thereof is to be described below.

Referring to FIG. 4a and FIG. 4b, the voice coil motor apparatus of the present invention comprises: a coil 41, a first guidance steel shaft 421 and a second guidance steel shaft 422, which are respectively fixed on the base 43 to form the non-moving member of the apparatus; the voice coil motor apparatus of the present invention also comprises a magnetic part 44, which is rigidly coupled to a lens holder 45 to cooperate with the lens module 46 also mounted thereon to form the moving member of the apparatus. The magnetic part 44 comprises: a first non-annular magnet 441, a second non-annular magnet 442, a first non-annular surface yoke 443, and a second non-annular surface yoke 444, which are stacked around the outer rim of a bottom yoke 445 with a central annular wall to form a non-circular magnetic structure with a rectangular contour in order to reduce the overall dimension of the magnetic structure. The coil 41 is exactly disposed inside the inner annular gap formed by the aforementioned magnetic part's components, and a current flows through the coil 41 to generate a thrust. The lens holder 45 has a first open-arc guiding face 451 and a second open-arc guiding face 452 respectively disposed at two symmetric corners, wherein the pre-load generated by the leakage magnetic line of the magnetic part 44 enables the open-arc guiding faces 451 and 452 to slidably contact the aforementioned guidance steel shafts 421 and 422. Thereby, no free-play will appear when the thrust drives the moving member to move relatively to the non-moving member.

In summary, the voice coil motor apparatus of the present invention achieves the objectives of miniaturization, mass-production, and non-free-play sliding motion via the following inventive approaches:

(a) utilizing the non-circular but rectangular magnetic structure to accomplish the design of the voice coil motor with the smallest dimension for a given output force and to overcome the bottleneck resulting from the fabrication problem of too thin magnet during the apparatus miniaturization;

(b) utilizing the magnetic pre-load, which is generated by the magnetic line from the magnetic part itself and through the guidance steel shaft, to eliminate the gap between the moving member and the non-moving member and to achieve the non-free-play sliding motion of the lens module.

It is to be noted: various equivalent modifications and variations of the present invention can be easily accomplished by the person skilled in the art according to the technical thoughts of the present invention disclosed above; however, those equivalent modifications and variations should not depart from the spirit of the present invention and should be included within the scope of the present invention.

What is claimed is:

1. A voice coil motor apparatus, comprising:
a movable magnetic part, utilized to form a primary magnetic field for generating a thrust and a leakage magnetic field for a pre-load, wherein said movable magnetic part comprises:
a bottom yoke with a central annular wall;
a plurality of non-annular magnets; and
a plurality of non-annular surface yokes stacked on said non-annular magnets along a moving axis of said voice coil motor apparatus and positioned around an outer rim of said central annular wall of said bottom yoke to form an inner annular gap between the inner rims of said non-annular surface yokes and said central annular wall, and wherein said movable magnetic part creates said primary magnetic field inside said inner annular gap and creates said leakage magnetic field in an outer rim of said movable magnetic part;
a static electrical part, comprising at least one coil that an appropriate current is to flow through;
a lens holder, rigidly coupled to said movable magnetic part to form a moving member, wherein said lens holder has plurality of round holes or open arc faces to form a plurality of guiding faces;
a plurality of guidance steel shafts, made of a ferromagnetic material and used as the guiding shafts for the sliding motion of said lens holder, wherein said guidance steel shafts are disposed beside said inner rims of guiding faces and respectively keep spacing to the outer rim of said movable magnetic part via said guiding faces, and said leakage magnetic field created by said moving magnetic part crosses said spacing to interlink said guidance steel shafts to form closed magnetic loops to generate said pre-loads; and
a base, utilized to fix said static electrical part and said plurality of guidance steel shafts to form a non-moving member.

2. The voice coil motor apparatus according to claim 1, wherein said static electric part is disposed inside said inner annular gap of said movable magnetic part and interacts with said primary magnetic field to generate said thrust.

3. The voice coil motor apparatus according to claim 1, wherein said lens holder has a threaded hole to fix a lens, and said outer rim of said lens holder has a plurality of circular or open-arc guiding faces to slidably contact said plurality of guidance steel shafts.

* * * * *